United States Patent [19]

Montemayor-Quiroga et al.

[11] Patent Number: 4,830,653
[45] Date of Patent: May 16, 1989

[54] GLASS ARTICLES OR SIMILAR MATERIALS TRANSFER MECHANISM

[75] Inventors: Jose A. Montemayor-Quiroga, Monterrey; Maximiano F. Ruiz-Torres, San Nicolás de los G.; Abel Gomez-Sanchez, Monterrey, all of Mexico

[73] Assignee: Vitrocrisa Cristaleria, S.A., Monterey, Mexico

[21] Appl. No.: 237,905

[22] Filed: Aug. 29, 1988

[30] Foreign Application Priority Data

Aug. 18, 1986 [MX] Mexico ........................... 3469

Related U.S. Application Data

[63] Continuation-in-part of Ser. No. 86,911, Aug. 18, 1987, abandoned.

[51] Int. Cl.⁴ ................................................. C03B 9/40
[52] U.S. Cl. ........................................ 65/260; 65/239; 65/241
[58] Field of Search ........................... 65/239, 241, 260

[56] References Cited

U.S. PATENT DOCUMENTS

| | | | |
|---|---|---|---|
| 1,766,573 | 6/1930 | Westin | 65/260 X |
| 1,766,574 | 6/1930 | Westin et al. | 65/260 X |
| 1,835,570 | 12/1931 | Lorenz | 65/260 X |
| 1,888,438 | 11/1932 | Smith | 65/241 |
| 4,298,373 | 11/1981 | Mumford | 65/260 |

Primary Examiner—Arthur Kellogg
Attorney, Agent, or Firm—Abelman Frayne Rezac & Schwab

[57] ABSTRACT

An article transfer mechanism to transfer glass articles between a receiving position and a delivering position, in straight line, between one or various sections of a process of manufacture of glass articles. The mechanism includes a frame. Guide shafts attached to said frame. A sliding support attached at said guide bars. A first planetary transmission coupled between said drive means and the sliding support, which through of a rotational movement of the transmission, the sliding support is moved in a straight line, with a backward-forward movement over said guide bars. A second planetary transmission coupled to said first planetary transmission, through the sliding support to generate a far larger stroke of the transfer mechanism. An assembly of piston and cylinder integrated in the second transmission to effectuate a downward-upward movement of said piston, when the transfer mechanism arriving to a receiving position or delivering position, and an arm attached on said piston to grasp or release an article, but maintaining a straight line of said articles, between a receiving position and a delivering position.

3 Claims, 3 Drawing Sheets

GLASS ARTICLES OR SIMILAR MATERIALS TRANSFER MECHANISM

BACKGROUND OF INVENTION

This is a continuation-in-part of application Ser. No. 086,911, filed Aug. 18, 1987, now abandoned.

In the manufacture of hollow glass articles, such as drinking glasses or chimney for oil lamps, once the glass articles have been formed in an appropriate machine, it then becomes necessary to trim off excess glass to final form the articles. This is done with a cutting apparatus common in the glass industry, which is operative to flame cut the excess glass from articles and simultaneously bead the cut edges. After the articles have been trimmed at one or both ends, they are then transported through a tempering furnace in which they are relieved of stresses accumulated in the process of their manufacture.

Known mechanisms for the handling of articles are used to feeding the recently formed glass articles from the cutting apparatus and transport same to the tempering lehr. An example of such mechanisms is to be found in U.S. Pat. No. 2,338,841, which describes a machine to fire polish the surface of glass articles. In this apparatus, a circular table has attached to it a series of burner units, and said table is positioned in order to rotate over an endless belt conveyor. With these types of machines, the articles that are to be polished are successively fed to a transfer station by means of a belt conveyor. When the articles get to the transfer station, same are transported to the rotating table by means of a transfer mechanism which is formed by: a transfer wheel which has radial arms that hook and pick up the articles in order to change them from the belt conveyor—through the use of a stationary supporting plate—towards the rotating table. The articles are guided during their transfer by means of a surface that has the form of an arch. In the same manner, once the article has been fire extracts the article from said machine and then are transferred back to the belt conveyor.

The handling of articles through the use of belt conveyor and feeding mechanisms is useful only with glasses or glass articles with a single cutting operation. However, in the case of the handling of articles with a stylized shape which require two cutting operations, it is necessary to handle the articles in a manual form for the following reasons:

1. Due to the fact that the lower end of the article comes out of the glass forming machine with a convex surface, said article has to be manually turned over in order to deposit same onto the belt conveyors.

2. A great variety of stylized shapes make stability difficult on the belt conveyors.

3. The articles that have a thin wall are necessary to maintain the temperature of same (while they travel on the conveyor) in order to prevent fractures due to cooling.

From the above analysis of the state of the prior art, it can be observed that practically the glass articles that are trimmed simultaneously in both ends are handled in manual form or, in machines that firstly handling a side of the article and afterward the other one.

A problem additional in the handling of the glass articles, is the limitation of space between the different mechanism or machines that form the glassware production process.

Due to the problems caused in the handling of the glass articles, the present invention is referred to a glass article or similar material transfer mechanism, which has the object of automating the handling of glass articles. This mechanism serves to lineally transfer the glass articles between a receiving position and a delivering position i.e. between a known glassware forming machines and a cutting apparatus or, between said cutting apparatus and the belt conveyor of a lehr.

Through of the this mechanism, the glass articles recently formed will be directly transferred without the use of belt conveyors, from the glass article forming machine to the cutting apparatus. This mechanism will start and finish its lineal movement with a zero velocity, having a maximum velocity at its medium part. This movement will prevent the articles from losing shape or cracks during the moment that they are transferred to the cutting apparatus or to the temperating lehr.

Furthermore, this mechanism occupy a less space between the diverse machines that form the process of production of glass. Also, it will eliminate the manual handling of the glass articles.

SUMMARY OF THE INVENTION

The first object of the present invention is to provide a transfer mechanism for glass articles or similar materials, which will directly transfer the articles from a glass forming machines to the cutting machines, eliminating the use of belt conveyors.

Other object of the present invention is to provide a transfer mechanism for glass articles or similar materials, which will start and finish its lineal movement with a zero velocity, having a maximum velocity at its medium part. This movement will prevent the articles from losing shape or cracks during the moment that they are transferred to the cutting apparatus or to the tempering lehr.

Another object of the present invention is to provide a transfer mechanism for glass articles or similar materials which will transport the articles in a lineal form with a considerable saving of space.

Still another object of the present invention is to provide a transfer mechanism for glass articles or similar materials which will ascend or descend the article before starting and after finishing its transfer movement.

An additional object of the present invention is to provide a transfer mechanism for glass articles or similar materials which will eliminate the manual handling of the articles.

These and other objects and advantages of the present invention will become evident to the experts in the field from the following detailed description of the present invention.

DESCRIPTION OF DRAWINGS

A preferred embodiment of the invention will now be described with reference to the accompanying drawings, in which.

DETAILED DESCRIPTION OF THE INVENTION

Figure 1:
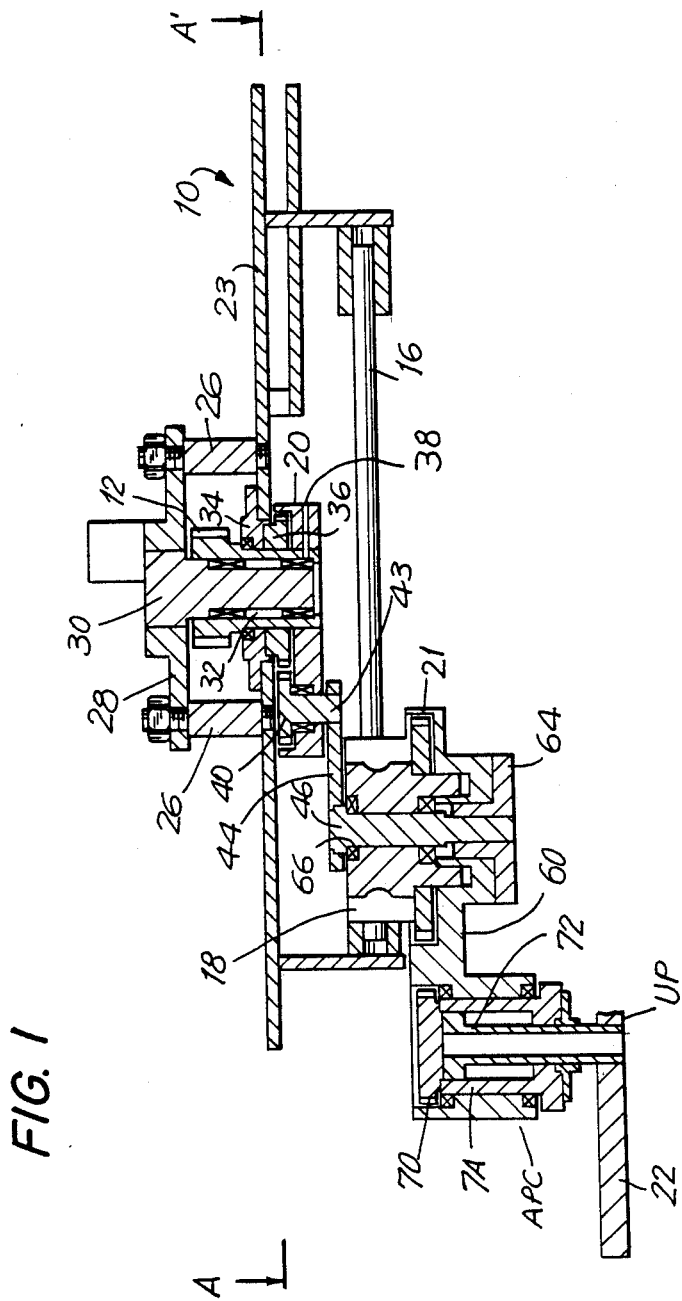
FIG. 1 is a plan view of the articles transfer mechanism of the present invention.
Figure 2:
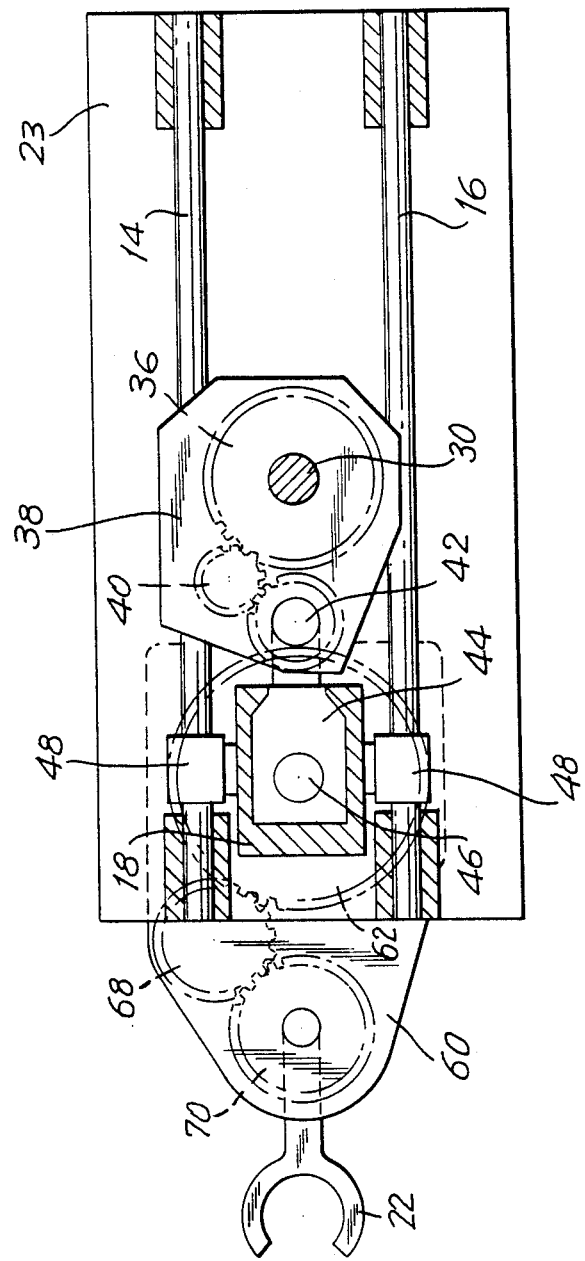
FIG. 2 is a plan view of the mechanism of the present invention, taking along the line A—A/ in FIG. 1; and, FIG. 3 a schematic representation of the path that describes the article when it is transferred from a receiving position to a delivering position.

Referring now, FIGS. 1 and 2 of the drawings, the article transfer mechanism of the present invention includes: a main frame 10; drive means (not shown) attached on the upper part of said frame 10; a first gear 12 attached to said drive means to rotate in said frame 10; guide shafts 14 and 16 attached to the lower part of the frame 10; a sliding support 18, attached to said guide shafts 14 and 16; a first planetary transmission 20, coupled between said first gear 12 and the sliding support 18, to move said sliding support 18 in a straight line, with a backward-forward movement over said guide shafts 14 and 16; a secondary planetary transmission 21 coupled to first planetary transmission 20, through the sliding support 18, to generate a far larger stroke of the transfer mechanism; an assembly of piston and cylinder APC coupled in the secondary planetary transmission 21 to effectuate and downward-upward movement of said piston, when the transfer mechanism arriving to a receiving position or to a delivering position; and an arm 22 to grasp or release an article A, attached at said assembly of piston and cylinder APC in order transfer with a lineal path an article (not shown). The union point UP, between the assembly APC of piston and cylinder and the arm 22, describe an elliptical path by means of the movement of the second planetary transmission 21, from a receiving position to a delivering position. However, one end of the arm 22 maintain a lineal path of an article A or articles, (not shown), as is showed in FIG. 3.

Now making particularly reference to each mechanism of the present invention, main frame 10, includes: a plate 23, wherein the guide shafts 14 and 16 are attached (FIGS. 1 and 2) parallel each other. On the upper part of said plate 23, pins 26 are positioned, which support a circular plate 28, leaving a space where the gear 12 is located, as will be described later.

As shown in FIG. 1 the first gear 12 is coupled, between the plate 23, support pins 26, and the circular plate 28. Said gear 12, designed just as is illustrated in said FIG. 1, is positioned through a support shaft 30, attached between the upper plate 23, and the circular plate 28. Said shaft 30, is fixed at the upper part of the circular plate 28, while its lower part cross the plate 23. Needle bearings 32, coupled between shaft 30 and gear 12, permits the free rotation of said gear 12, in shaft 30. A support guide 34, placed on the upper plate 23, holds the unit of gear 12, and bearing 32, in said plate 23.

With particular reference to the first planetary transmission 20, this is attached to said gear 12, as is showed in FIGS. 1 and 2. Said transmission 20, comprising: a fixed gear 36 attached to the support guide 34, and located on the lower part of plate 23. Said gear 36 is crossed through at its internal diameter by gear 12 and shaft 30. A first arm 38 attached to the lower part of gear 12 having a rotating movement by means of said gear 12. A satellite gear 40 and a pinion 42 are attached at the free end of first arm 38. The pinion 42 having a small shaft 43, which cross perpendicularly the free end of said first arm 38. Also, said pinion 42 is engaged with the satellite gear 40. Said satellite gear 40 is respectively engaged with the fixed gear 36.

A second arm 44 attached by one end, to the shaft 43 of the pinion 42 and, by the other end, to the sliding support 18. A shaft 46 fixed in one end of the arm 44 is connected in perpendicular form with the central part of the sliding support 18. Then, when the arm 38 is moved with a rotation movement, the sliding support 18 is transferred in a straight line with a backward-forward movement over said guide shafts 14 and 16. Said sliding support 18, includes, besides, a pair of bearings 48, which respectively slide in each one of the guide shafts 14 and 16.

With specific reference to the second planetary transmission 21, this is coupled to the shaft 46. In this particular case, the second transmission 21, comprising: a third arm 60; a second fixed gear 62 attached between the third arm 60 and the sliding support 18. Said gear 62 is attached rigidly under the sliding support 18, whose internal diameter is crossed by the shaft 46, but permits the free rotation of said shaft 46 in said support 18. A cap 64 attached by its external diameter to said arm 60, and is also attached through its central part to the lower end of said shaft 46. Bearings 66, attached to the said shaft 46 to facilitate the rotation of the shaft 46 in said support 18, as is illustrated in FIGS. 1 and 2. A pinion 70 attached at the free end of the arm 60, which is engaged with a satellite gear 68. Said satellite gear 68 is respectively engaged with the gear 62, as is illustrated in FIG. 2.

Also, the transference mechanism of the present invention comprising, an assembly APC of piston and cylinder to effectuate a downward-upward movement of the piston, when the transfer mechanism arriving to the receiving or delivering positions. This assembly APC comprises a pneumatic piston 72 and cylinder 74 integrated to one of the ends of said arm 60, which is located under the satellite gear 70. As previously was described, the arm 22 is attached to the assembly of piston and cylinder and, specifically to the shaft of piston 72, in order to transfer with a lineal path an article A. The union point UP of the arms 22 and 60 is moved through of an elliptical path by means of the second planetary transmission 21, from a receiving position to a delivering position, but maintaining the lineal path of the article, as is showed in FIG. 3.

Figure 3:
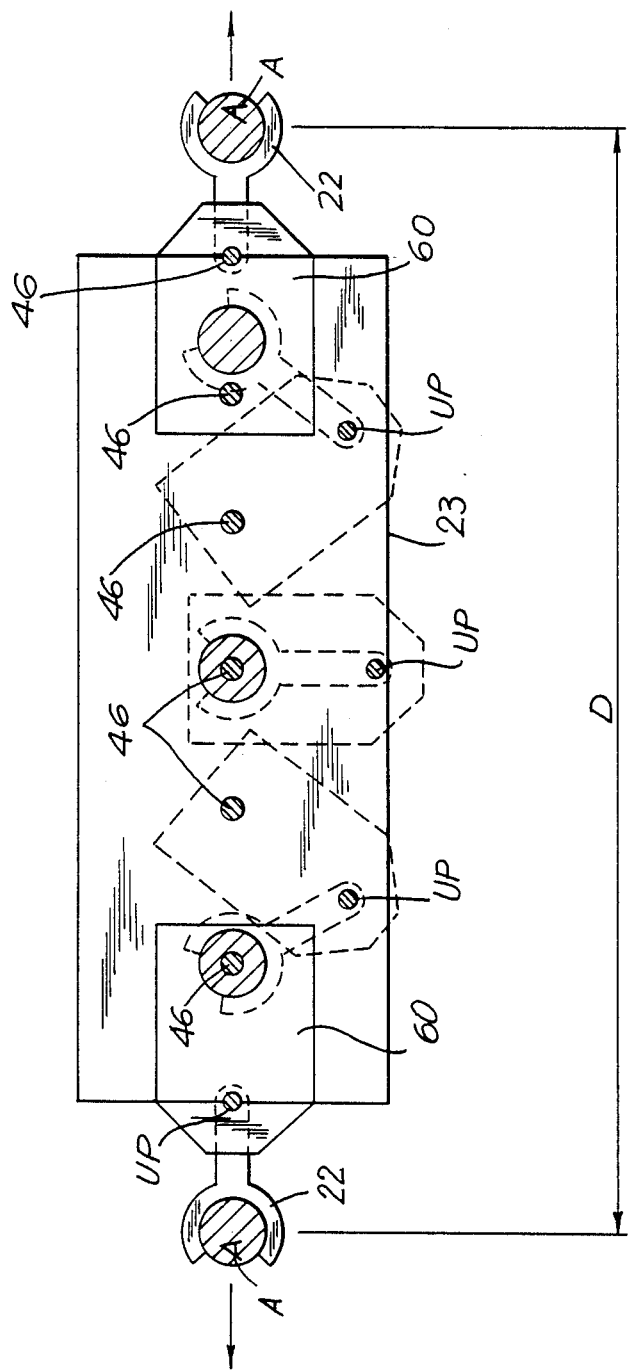

As can be observed in FIGS. 2 and 3, when an article is transferred from a receiving position to a delivering position, the article maintain always a lineal path. Meanwhile, the union point UP, between the third arm 60 and arm 22 describes an elliptical path. Simultaneously, the shaft 46 is transferred in a linear path, through of the movement of the first arm 38, first planetary transmission 20 and second arm 44. The movement of first arm 38 having a rotational movement. Simultaneously, the second arm 44 having a rotation and translation movement, similar, but in an inverse direction, to that described by the third arm 60 and arm 22 in FIG. 3.

Now that each one of the components of the present invention has been described, it should be noted that, notwithstanding that the arm 22 shown the transference of an article, said arm 22 can be designed to transfer two or more articles maintaining the lineal or straight path of the same.

The foregoing description is illustrative of a preferred embodiment of the invention, and is in no way to be considered as limiting. It will be understood by experts in the field that other variations may be made without departing from the scope of the invention as defined in the following claims.

We claim:

1. A glass article or similar material transfer mechanism, comprising:
    a frame;

drive means attached on the upper part of said frame;
at least a guide bar attached to the lower part of the frame
a sliding support attached at said guide bars;
first transmission means coupled between said drive means and the sliding support which, through of a rotational movement of said first transmission means, the sliding support is moved in a straight line, with a backward-forward movement over said guide bars;
second transmission means coupled to said first transmission means, through of the sliding support to generate a far larger stroke of the transfer mechanism;
an assembly of piston and cylinder integrated in the second transmission means to effectuate an downward-upward movement of said piston, when the transfer mechanism arriving to receiving or delivering positions; and,
an arm attached on said piston to grasp or release an article, but maintaining a straight line between a receiving position and a delivering position.

2. The transfer mechanism of claim 1, in which the first transmission means comprises:
a fixed gear attached rigidly to said frame;
a first arm connected to drive means;
a satellite gear positioned on said first arm and operative to rotate on the same, said satellite gear having connected a first shaft;
a pinion engaged with the fixed gear and the satellite gear; and,
a second arm connected to rotate with the first shaft, said second arm including a second shaft which is attached to said sliding support and said second transmission means, to conjointly effectuate the transference movement.

3. The transfer mechanism of claim 1, in which the second transmission means comprises:
a second fixed gear attached rigidly to the sliding support;
a third arm connected to the first transmission means, which is moved with a translation and rotation movement, by means of said first transmission means, between a receiving position and a delivering position;
a satellite gear positioned on said third arm and operative to rotate on the same; and,
a pinion engaged with the second fixed gear and the satellite gear.

* * * * *